(12) United States Patent
Liu et al.

(10) Patent No.: US 10,883,713 B2
(45) Date of Patent: Jan. 5, 2021

(54) ENERGY SAVING BOILER SYSTEM OF STEAM SUPPLY

(71) Applicant: Guangdong University of Technology, Guangzhou (CN)

(72) Inventors: Xiaozhou Liu, Guangzhou (CN); Wenxing Liu, Guangzhou (CN); Yu Zhang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 15/746,276

(22) PCT Filed: May 12, 2016

(86) PCT No.: PCT/CN2016/081849
§ 371 (c)(1),
(2) Date: Jan. 19, 2018

(87) PCT Pub. No.: WO2017/075955
PCT Pub. Date: May 11, 2017

(65) Prior Publication Data
US 2018/0209638 A1    Jul. 26, 2018

(30) Foreign Application Priority Data
Nov. 8, 2015 (CN) .......................... 2015 1 0760806

(51) Int. Cl.
*F22B 37/72* (2006.01)
*F22B 33/16* (2006.01)
(Continued)

(52) U.S. Cl.
CPC .............. *F22B 33/16* (2013.01); *F01K 3/245* (2013.01); *F22B 33/14* (2013.01); *F22D 1/36* (2013.01); *F22D 1/02* (2013.01); *Y02P 80/15* (2015.11)

(58) Field of Classification Search
CPC .. F22B 37/72; F22B 29/02; F22B 1/18; F22B 1/1838; F22B 37/34
See application file for complete search history.

(56) References Cited

U.S. PATENT DOCUMENTS 5,793,831 A * 8/1998 Tsiklauri ................. F01K 3/181
376/317
9,702,542 B2 * 7/2017 Victor .................. C10G 11/182

FOREIGN PATENT DOCUMENTS

CN        1163370 A    10/1997
CN     103206699 A     7/2013
(Continued)

OTHER PUBLICATIONS

International Search Report for PCT/CN2016/081849, dated Aug. 18, 2016 (4 pgs).

*Primary Examiner* — Gregory A Wilson
(74) *Attorney, Agent, or Firm* — Bradley J. Thorson

(57) ABSTRACT

An energy-saving gas supply boiler system, comprising: a steam boiler, a flue gas pipeline, a heat exchanger, a steam generator and an ejector. The steam boiler comprises a body, a combusting apparatus, a flue gas outlet, a water outlet and a high pressure steam outlet. The heat exchanger comprises a high temperature flue gas inlet, a medium temperature flue gas outlet, a cooling water inlet and a hot water outlet. Cooling water undergoes heat exchange with flue gas and flows out from the hot water outlet. The steam generator comprises a generator body, a hot water inlet and a low pressure steam outlet. The ejector comprises a high pressure steam inlet, a mixing steam outlet and a low pressure steam inlet. The high pressure steam inlet delivers high pressure steam to the ejector. The low pressure steam inlet delivers low pressure steam to the ejector.

10 Claims, 2 Drawing Sheets

(51) Int. Cl.
*F22B 33/14* (2006.01)
*F01K 3/24* (2006.01)
*F22D 1/36* (2006.01)
*F22D 1/02* (2006.01)

(56) References Cited

FOREIGN PATENT DOCUMENTS

| | | | | |
|---|---|---|---|---|
| CN | 103398591 A | 11/2013 | | |
| CN | 104696938 A | 6/2015 | | |
| CN | 105423271 A | 3/2016 | | |
| GB | 680057 A | * 10/1952 | ............. | F22B 37/72 |
| WO | WO-2017075955 A1 | * 5/2017 | ............. | F22B 33/14 |

* cited by examiner

ENERGY SAVING BOILER SYSTEM OF STEAM SUPPLY

BACKGROUND OF THE INVENTION

Field of the Invention

The present invention relates to a boiler equipment, and more particularly to a steam boiler.

Description of the Related Art

The steam boiler is one type of industrial boiler that heats water into high temperature steam. The steam boilers are divided into three types as electric steam boiler, oil steam boiler, and gas steam boiler according to the energy sources; two types as vertical and horizontal steam boiler according to the structure; and three types as large, middle and small steam boilers according to the scale.

The large steam boiler is usually in the form of three-pass horizontal structure, which is able to produce steam pressure of 1.3 MPa under full load operation. However, users just need steam pressure of 0.6 MPa. Therefore, it results in a waste of energy resources because the large steam boilers often operate under low load condition.

A pressure steam generator system as disclosed in China Patent Publication No. 204005894U comprises a steam generator body, a temperature preservation water tank and a system control box for controlling the overall running conditions of the steam generator body and the temperature preservation water tank. A combustor is provided in the lower portion of the steam generator body and a water level controller is provided on the steam generator body. A process steam supply piping is connected to the top part of the steam generator body. A heating piping is connected to the process steam supply piping on one end and the other end thereof is connected to the temperature preservation water tank. A water supply piping is connected to the lower portion of the steam generator body on one end and the other end thereof is connected to the temperature preservation water tank. A water refilling piping is also connected to the water supply piping in parallel. However, it's difficult to regulate the pressure of the steam generated by such pressure steam generator system according to the users' requirements.

An intelligent high-temperature and low-pressure controllable steam boiler as disclosed in China Patent Publication No. 101749694A is comprised of a boiler body, a liquid-phase heating device and a vapor-phase heating device. A control system that is used to regulate the temperature and pressure of the steam boiler is provided on the outer part of the boiler body. The control system includes a temperature sensor and a pressure sensor that are located on the boiler body. The temperature sensor and the pressure sensor are respectively electrically connected to an amplifying circuit, an A/D analog-to-digital converting circuit and the input end of a computer in sequence. The output end of the computer is electrically connected to a security solenoid valve, a steam supply solenoid valve, a vapor-phase thermal conductive component heating power and a liquid-phase thermal conductive component heating power through a D/A digital-to-analog converting circuit and a switching circuit respectively. However, such intelligent high-temperature and low-pressure controllable steam boiler achieves the target steam supply pressure by using complex temperature and pressure control loop and employing a large number of precise control components, resulting in high cost and high tendency for the whole system to fail once one of the components malfunctions.

Therefore, it is in urgent demand to provide an improved steam boiler that increases operating efficiency and easily regulates the steam pressure.

SUMMARY OF THE INVENTION

The object of the present invention is to provide an energy saving boiler system of steam supply, which is capable of operating the steam boiler at full load, while adjusting the steam pressure without modifying the structure of the steam boiler body.

According to the present invention, an energy saving boiler system of steam supply is provided, comprising a steam boiler and a flue gas channel. The steam boiler is comprised of a boiler body, a combustor that is provided on one end wall of the boiler body, a flue gas outlet that is provided on the other end wall of the boiler body, and a water inlet and a high pressure steam outlet that are provided on the top of the boiler body. The flue gas channel connects the flue gas outlet of the boiler body to a chimney. The energy saving boiler system of steam supply further comprises a heat exchanger, a steam generator and an injector. The heat exchanger is provided in the flue gas channel and is comprised of a high temperature flue gas inlet, a middle temperature flue gas outlet, a cold water inlet and a hot water outlet. The cold water enters the heat exchanger through the cold water inlet and changes to hot water that flows out through the hot water outlet after exchanging heat with the flue gas. The steam generator is comprised of a generator body, a hot water inlet that is provided on the bottom of the generator body and a low pressure steam outlet that is provided on the top of the generator body. The hot water inlet is connected to the hot water outlet of the heat exchanger through piping, so as to deliver the hot water in the heat exchanger into the generator body. The injector comprises a housing, a high pressure steam inlet that is provided on one end wall of the housing, a mixed steam outlet that is provided on the other end wall of the housing, and a low pressure steam inlet that is provided on the side wall of the housing. The high pressure steam inlet is connected to the high pressure steam outlet of the steam boiler through piping to deliver the high pressure steam into the injector, and the low pressure steam inlet is connected to the low pressure steam outlet of the steam generator through piping to deliver the low pressure steam into the injector.

Preferably, the injector is further comprised of an injecting duct that extends from the high pressure steam inlet to the inner portion of the injector, such that under the negative pressure generated by the high pressure steam that flows into the injector at high speed, the low pressure steam is suctioned into the injector from the low pressure steam outlet of the steam generator.

More preferably, the injecting duct is tapering, such that under the negative pressure generated by the high pressure steam that flows into the injector at high speed, the hot water in the steam generator is boiled into low pressure steam under low pressure, and then the resulting low pressure steam is suctioned into the injector.

Optionally, impellers are further provided in the injector adjacent to the mixed steam outlet for rotating and mixing the steam.

Preferably, the distance between the terminal end of the injecting duct of the injector and one end wall is longer than that between the low pressure steam inlet and the end wall.

Optionally, the energy saving boiler system of steam supply is further comprised of a mixer that is connected to the mixed steam outlet of the injector, so as to deliver the mixed steam from the injector to users through piping after intensive mixing.

Optionally, the mass ratio of the high pressure steam that is introduced into the injector from the high pressure steam inlet in unit time to the low pressure steam that is introduced into the injector from the low pressure steam inlet in unit time is set to 2-5:1. Thus it is easy to regulate the steam pressure as required conveniently through simple adjustment to the structure of the injector.

Optionally, the energy saving boiler system of steam supply further comprises an air preheater that is provided downstream the heat exchanger along the flow direction of flue gas in the flue gas channel, the air preheater is comprised of a cold air inlet, a hot air outlet, a middle temperature flue gas inlet and a low temperature flue gas outlet. The flue gas of about 150~250° C. from the middle temperature flue gas outlet of the heat exchanger enters the air preheater through the middle temperature flue gas inlet and preheats the cold air of 20° C. from the cold air inlet into low temperature flue gas of about 60~120° C. Then the resulted low temperature flue gas is exhausted to the chimney through the low temperature flue gas outlet. After being preheated to about 80~150° C., the hot air will be delivered through piping from the hot air outlet to the combustor, so as to support combustion.

Preferably, the pressure of the high pressure steam produced by the steam boiler is set to about 1.0~1.5 MPa, and the pressure of the low pressure steam generated by the steam generator is set to about 0.04~0.06 MPa.

Optionally, the steam boiler comprises a steam boiler body, a combustion chamber that is provided in the lower portion of the boiler body, a boiler steam drum that is provided above the combustion chamber for filling water, a combustor that is provided on one end wall of the boiler body for injecting fuel into the combustion chamber for radiation heating the boiler steam drum by combusting the fuel, a flue gas outlet that is provide on the other end wall of the boiler body, a fire tube that connects the combustion chamber and the flue gas outlet for heat exchanging between the flue gas and the water in the boiler steam drum, and a water inlet and a high pressure steam outlet that are provided on the top of the boiler steam drum.

Optionally, the steam boiler could be any type of the steam boiler available in the market, preferably the large horizontal steam boiler.

Optionally, the heat exchanger comprises a flue gas flow path and a fluid flow path. The cold water of about 20° C. enters the heat exchanger through the cold water inlet of the fluid flow path and exchanges heat with the flue gas flowing past the flue gas flow path, resulting in hot water of about 80~95° C. that flows out of the hot water outlet of the fluid flow path. After heat exchanging in the heat exchanger, the high temperature flue gas of 250~350° C. from the flue gas outlet of the steam boiler will generate middle temperature flue gas of about 150~250° C.

Optionally, the heat exchanger is further comprised of a housing, a middle partition plate that divides the internal space in the housing into a flue gas flow path and a fluid flow path that are parallel with each other in reverse, and several heat pipes that are arranged through the middle partition plate. The evaporating end of the heat pipe extends in the flue flow path and the condensing end thereof extends in the fluid flow path.

Preferably, the working media operating in the heat pipes of the heat exchanger is naphthalene that is applicable in the temperature condition of about 300° C. and the like.

Optionally, the air preheater is comprised of a housing, a middle partition plate that divides the internal space in the housing into a flue gas flow path and an air flow path that are parallel with each other in reverse, and several heat pipes that are arranged through the middle partition plate. The evaporating end of the heat pipe extends in the flue gas flow path and the condensing end thereof extends in the air flow path.

Preferably, the working media operating in the heat pipes of the air preheater is water or ammonia that is applicable under the temperature condition of about 150° C. and the like.

Optionally, the heat exchanger and the air preheater can be a surface-type heat exchanger. That is to say, two kinds of fluid with different temperature flow in a space that is divided by a wall and exchange heat through the heat conduction of the wall and the surface convention of the fluid on the wall surface. For example, in the case in which a heat exchanging coiled pipe is provided in the flue gas channel, the fluid exchange heat with the flue gas from the flue gas channel in the heat exchanging coiled pipe.

Alternatively, an electric heater can be used to heat the hot water in the steam generator into low pressure steam, and the resulted low pressure steam is then introduced into the injector to mix with the high pressure steam.

The fuel for the combustor is selected from a group consisting of natural gas, coal gas, liquefied petroleum gas etc.

The steam generated by such boiler system could be used for sterilization, drying, stewing and heating supply and other applications. The steam is also applicable in the areas such as public bath, school, hospital, restaurant, food processing plant and chemical processing plant.

The beneficial technical effects of the present invention are as follows: (1) the manner of mixing the high pressure steam generated in the steam boiler and the low pressure steam generated in the steam generator is easy to achieve the desired steam pressure through adjusting according to the users' requirements; (2) the manner of mixing the high pressure steam and the low pressure steam means the steam boiler can operate at full load and changes the situation that operating the large steam boiler at low load to meet the users' object steam pressure and result to waste the energy resources; (3) under the negative pressure effect formed by the injector, the hot water in the steam generator is boiled into low pressure steam under low pressure and the resulting low pressure steam is suctioned directly into the injector for mixing with the high pressure steam, the operating cost of the system is reduced since there's no need to add additional low pressure steam heating devices; (4) the system according to the present invention is capable of regulating the steam pressure as required on the premise of making full use of the efficiency of the steam boiler, without modifying the structure of the existing steam boilers; (5) by using the heat of the flue gas generated in the steam boiler heats water for preparing low pressure steam and preheats the air for combustion supporting, energy saving is achieved in operating system since the flue gas generated by the steam boiler is fully used; (6) by using the heat exchanger and the air preheater to reduce the temperature of the high temperature flue gas generated by the steam boiler, the temperature of the flue gas exhausted by the boiler system is reduced and the environmental pollution is lessened.

DETAILED DESCRIPTION OF THE INVENTION

Figure 1:
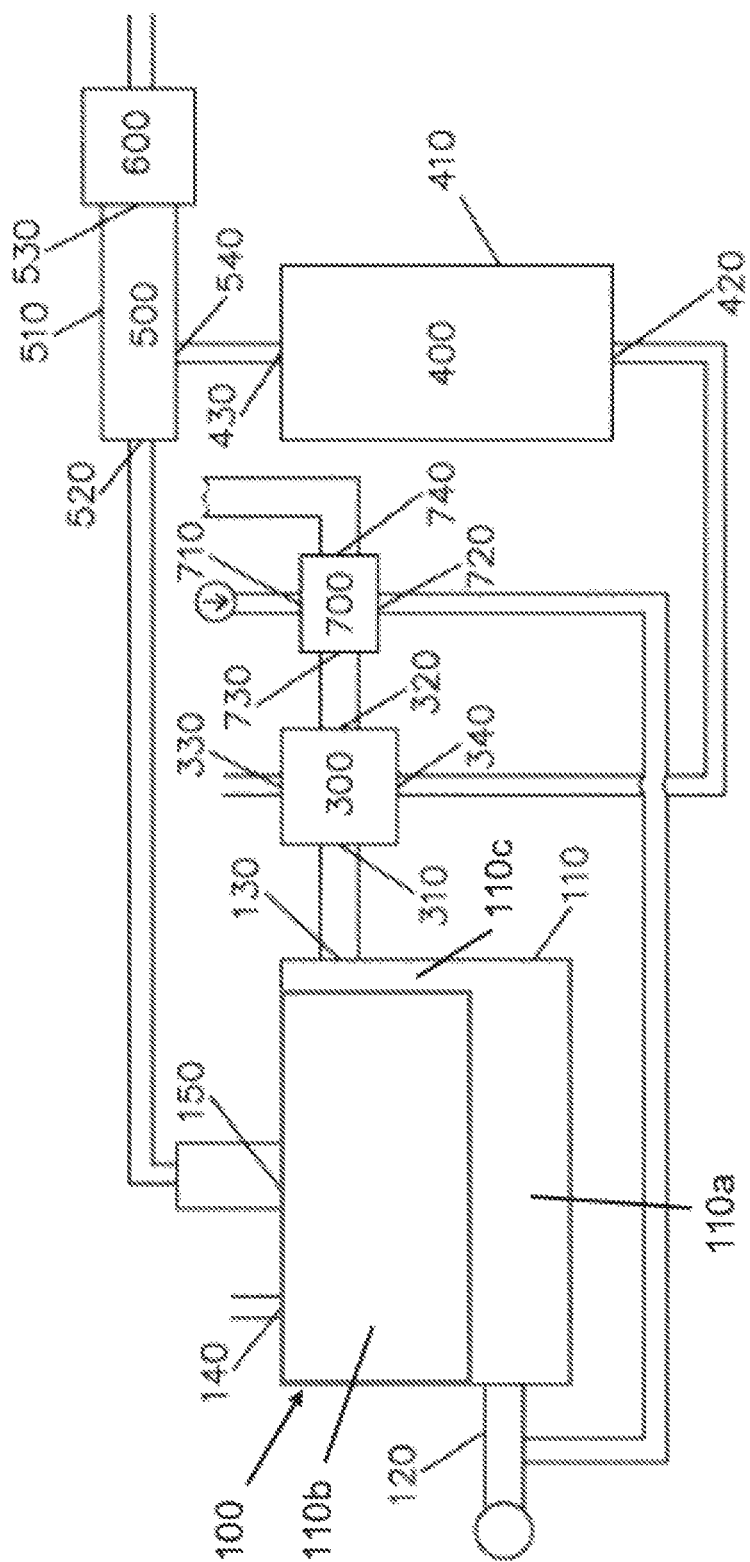
FIG. 1 is a structural illustration of the energy saving boiler system of steam supply according to the present invention.

Now refer to FIG. 1, according to one unlimited embodiment of the present invention, an energy saving boiler system of steam supply comprises a steam boiler 100, a heat exchanger 300, a steam generator 400 and an injector 500.

The steam boiler 100 is comprised of a boiler body 100, a combustor 120 that is provided on one end wall of the boiler body 110, a flue gas outlet 130 that is provided on the other end wall of the boiler body 110, and a water inlet 140 and a high pressure steam outlet 150 that are provided on the top of the boiler body 110. A flue gas channel (not labeled) connects the flue gas outlet 130 of the boiler body 110 to a chimney (not shown). In this unlimited embodiment, the steam boiler 100 is a large horizontal steam boiler and the pressure of the high pressure steam produced by the steam boiler 100 is set to about 1.3 MPa. The temperature of the high temperature flue gas exhausted from the flue gas outlet 130 of the boiler body 110 is about 300° C.

The heat exchanger 300 is provided in the flue gas channel and comprises a high temperature flue gas inlet 310, a middle temperature flue gas outlet 320, a cold water inlet 330 and a hot water outlet 340. The cold water of about 20° C. enters the heat exchanger 300 through the cold water inlet 330 and changes to hot water of about 90° C. which flows out through the hot water outlet 340 after exchanging heat with the flue gas. The temperature of the middle temperature flue gas exhausted from the middle temperature flue gas outlet 320 of the heat exchanger 300 is about 220° C.

The steam generator 400 is comprised of a generator body 410, a hot water inlet 420 that is provided on the bottom of the generator body 410 and a low pressure steam outlet 430 that is provided on the top of the generator body 410. The hot water inlet 420 is connected to the hot water outlet 340 of the heat exchanger 300 through piping, so as to deliver the hot water in the heat exchanger 300 to the generator body 410. In this unlimited embodiment, the pressure of the low pressure steam generated by the steam generator 400 is set to about 0.05 MPa.

Figure 2:
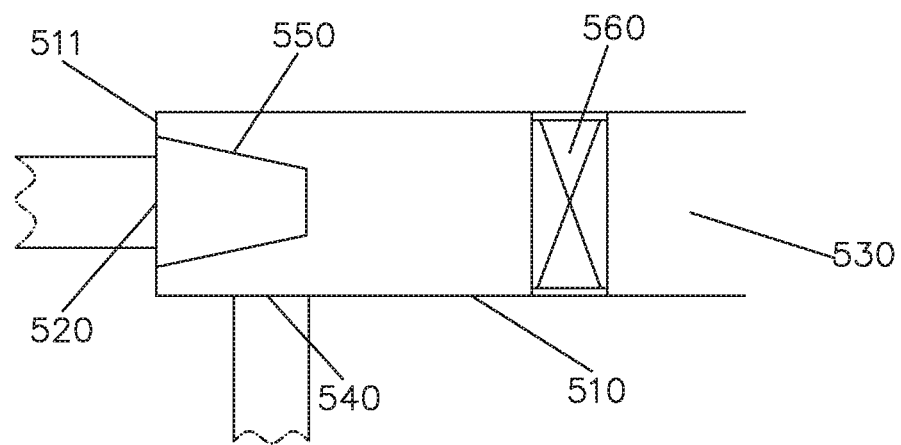
FIG. 2 is an internal structural illustration of the injector according to the present invention.

FIG. 2 is an internal structural illustration of the injector according to the present invention. As shown in FIG. 2, the injector 500 is comprised of a housing 510, a high pressure steam inlet 520 that is provided on one end wall 511 of the housing, a mixed steam outlet 530 that is provided on the other end wall of the housing, and a low pressure steam inlet 540 that is provided on the side wall of the housing. The high pressure steam inlet 520 is connected to the high pressure steam outlet 150 of the boiler body 100 through piping, so as to deliver the high pressure steam into the injector 500. The low pressure steam inlet 540 is connected to the low pressure steam outlet 430 of the steam generator 400 through piping, so as to deliver the low pressure steam into the injector 500.

The injector 500 is further comprised of an injecting duct 550 that extends from the high pressure steam inlet to the inner portion of the injector 500, such that under the negative pressure generated by the high pressure steam that flows into the injector 500 at high speed, the low pressure steam is suctioned into the injector 500 from the low pressure steam outlet 430 of the steam generator 400. Impeller 560 is further provided in the injector 500 adjacent to the mixed steam outlet 530 for rotating and mixing the steam. In this unlimited embodiment, the injecting duct 550 is tapering, such that under the negative pressure generated by the high pressure steam that flows into the injector 500 at high speed, the hot water in the steam generator 400 is boiled into low pressure steam under low pressure, then the resulting low pressure steam is suctioned into the injector 500. The distance between the terminal end of the injecting duct 550 of the injector 500 and the end wall 511 is longer than that between the low pressure steam inlet 540 and the end wall 511.

As a unlimited embodiment, the steam boiler 100 is comprised of a combustion chamber 110a that is provided in the lower portion of the boiler body 110, a boiler steam drum 110b that is provided above the combustion chamber for filling water, and a fire tube 110c that connects the combustion chamber and the flue gas outlet 130 for heat exchanging between the flue gas and the water in the boiler steam drum 110b. The combustor 120 is provided on one end wall of the boiler body 110, so as to inject the fuel into the combustion chamber 110a for radiation heating the boiler steam drum 110b by combusting the fuel. The water inlet 140 and the high pressure steam outlet 150 are provided on the top of the boiler steam drum.

As a unlimited embodiment, the heat exchanger 300 is comprised of a housing, a middle partition plate that divides the internal space in the housing into a flue gas flow path and a fluid flow path that are parallel with each other in reverse, and several heat pipes that are arranged through the middle partition plate. The evaporating end of the heat pipe extends in the flue gas flow path and the condensing end of the heat pipe extends in the fluid flow path. The working media operating in the heat pipes of the heat exchanger 300 is naphthalene that is applicable in the temperature condition of about 300° C.

As an alternative embodiment, the boiler system is further comprised of a mixer 600. The mixer 600 is connected to the mixed steam outlet 530 of the injector 500, so as to deliver the mixed steam from the injector 500 to users through piping after intensive mixing.

As another alternative embodiment, the boiler system further comprises an air preheater 700. The air preheater is provided downstream the heat exchanger 300 along the flow direction of flue gas in the flue gas channel. The air preheater 700 is comprised of a cold air inlet 710, a hot air outlet 720, a middle temperature flue gas inlet 730 and a low temperature flue gas outlet 740. The flue gas from the middle temperature flue gas outlet 320 of the heat exchanger 300 enters the air heater 700 through the middle temperature flue gas inlet 730 and preheats the cold air from the cold air inlet 710 into low temperature flue gas of 120° C. The resulted low temperature flue gas is exhausted to the chimney through the low temperature flue gas outlet 740. After being preheated to about 110° C., the air is delivered through piping from the hot air outlet 720 to the combustor 120, so as to support combustion.

The air preheater 700 is comprised of a housing, a middle partition plate that divides the internal space in the housing into a flue gas flow path and an air flow path that are parallel with each other in reverse, and several heat pipes that are arranged through the middle partition plate. The evaporating end of the heat pipe extends in the flue gas flow path and the condensing end of the heat pipe extends in the air flow path. In this unlimited embodiment, the working media operating in the heat pipes of the air preheater 700 is ammonia that is applicable under the temperature condition of about 150° C.

During the operation, the flue gas from the steam boiler 100 heats the cold water into hot water of about 90° C. in the heat exchanger 300. And the resulted hot water of 90° C. is delivered to the steam generator 400 through piping. About 13 kilograms high pressure steam that generated in the steam boiler is delivered to the high pressure steam inlet 520 of the injector 500 through piping. The low pressure steam outlet 430 of the steam generator 400 is connected to the low pressure steam inlet 540 of the injector 500. Under the injection effect of the high pressure steam, negative pressure is generated in the steam generator 400 which is connected to the injector 500, resulting the hot water of 90° C. to boil and generate about 0.5 kilogram low pressure steam. The generated 0.5 kilogram low pressure steam is introduced into the injector 500 under the negative pressure and enters the mixer 600 that is connected to the injector 500. 6 kilograms middle pressure steam is generated in the mixer 600 by intensive mixing the high pressure steam with the low pressure steam and is then delivered to the users directly. The mass ratio of the high pressure steam that is introduced into the injector 500 from the high pressure steam inlet 520 in unit time to the low pressure steam that is introduced into the injector 500 from the low pressure steam inlet 540 is set to 3:1.

Furthermore, after heat exchanging with the flue gas in the air preheater 700, the preheated cold air enters into the combustor 120 for supporting combustion and increasing efficiency. The energy saving boiler system of steam supply according to the present invention can take full use of steam boiler, thus avoiding wasting energy for meeting the users' requirement in middle and low pressure steam, without any additional cost.

Although the preferred embodiments of the present invention have been described in detail herein, it is understood that the present invention is not limited to the detailed description and the illustrative specific structures. The skilled in the art will be able to implement other variations and amendments thereof without departing from the nature and scope of the present invention. For example, it is practical to adjust the mass ratio of the high pressure steam that is introduced into the injector in unit time to the low pressure steam that is introduced into the injector in the unit time based on the operating condition; or eliminating the heat exchanger from the boiler system, adopting the other means to heat the hot water in the steam generator into low pressure steam; or adjusting the number of the combustors according to the pressure valve of the high pressure steam in need. Furthermore, the parameters such as temperature or pressure value throughout the system should be properly selected based on the particular operating conditions in the disclosed scope of the present invention.

The invention claimed is:

1. An energy saving boiler system of steam supply, comprising:
 a steam boiler that is comprised of a boiler body, a combustor that is provided on one end wall of the boiler body, a flue gas outlet that is provided on the other end wall of the boiler body, and a water inlet and a high pressure steam outlet that are provided on the top of the boiler body; and
 a flue gas channel that connects the flue gas outlet of the boiler body to a chimney;

wherein, the energy saving boiler system of steam supply further comprises:
 a heat exchanger that is provided in the flue gas channel and is comprised of a high temperature flue gas inlet, a middle temperature flue gas outlet, a cold water inlet and a hot water outlet, the cold water enters the heat exchanger through the cold water inlet and changes to hot water that flows out through the hot water outlet after exchanging heat with the flue gas;
 a steam generator that is comprised of a generator body, a hot water inlet that is provided on the bottom of the generator body and a low pressure steam outlet that is provided on the top of the generator body, the hot water inlet is connected to the hot water outlet of the heat exchanger by means of piping, so as to deliver the hot water in the heat exchanger into the generator body; and
 an injector that is comprised of a housing, a high pressure steam inlet that is provided on one end wall of the housing, a mixed steam outlet that is provided on the other end wall of the housing, and a low pressure steam inlet that is provided on the side wall of the housing, the high pressure steam inlet is connected to the high pressure steam outlet of the steam boiler by means of piping, so as to deliver the high pressure steam into the injector, and the low pressure steam inlet is connected to the low pressure steam outlet of the steam generator by means of piping, so as to deliver the low pressure steam into the injector.

2. The energy saving boiler system of steam supply according to claim 1, wherein the injector is further comprised of an injecting duct that extends from the high pressure steam inlet to the inner portion of the injector, such that under the negative pressure generated by the high pressure steam that flows into the injector at high speed, the low pressure steam is suctioned into the injector from the low pressure steam outlet of the steam generator.

3. The energy saving boiler system of steam supply according to claim 2, wherein the injecting duct is tapering, such that under the negative pressure generated by the high pressure steam that flows into the injector at high speed, the hot water in the steam generator is boiled into low pressure steam under low pressure, and then the resulting low pressure steam is suctioned into the injector.

4. The energy saving boiler system of steam supply according to claim 3, wherein an impeller is further provided in the injector adjacent to the mixed steam outlet for rotating and mixing the steam.

5. The energy saving boiler system of steam supply according to claim 3, wherein the distance between the terminal end of the injecting duct of the injector and the one end wall of the injector is longer than that between the low pressure steam inlet and the one end wall of the injector.

6. The energy saving boiler system of steam supply according to claim 3, wherein further comprises a mixer that is connected to the mixed steam outlet of the injector, so as to deliver the mixed steam from the injector to users by means of piping after intensively mixing.

7. The energy saving boiler system of steam supply according to claim 3, wherein the mass ratio of the high pressure steam that is introduced into the injector from the high pressure steam inlet in unit time to the low pressure steam that is introduced into the injector from the low pressure steam inlet in unit time is set to 2-5:1.

8. The energy saving boiler system of steam supply according to claim 1, wherein further comprises an air preheater that is provided downstream the heat exchanger along the flow direction of flue gas in the flue gas channel, the air preheater is comprised of a cold air inlet, a hot air outlet, a middle temperature flue gas inlet and a low temperature flue gas outlet, the flue gas from the middle temperature flue gas outlet of the heat exchanger enters the air preheater through the middle temperature flue gas inlet and preheats the cold air from the cold air inlet, then is exhausted to the chimney through the low temperature flue gas outlet, and the preheated air is delivered from the hot air outlet to the combustor by means of piping so as to support combustion.

9. The energy saving boiler system of steam supply according to claim 1, wherein the pressure of the high pressure steam produced by the steam boiler is set to 1.0-1.5 MPa, and the pressure of the low pressure steam generated by the steam generator is set to 0.04-0.06 MPa.

10. The energy saving boiler system of steam supply according to claim 1, wherein the boiler system further comprises a combustion chamber that is provided in the lower portion of the boiler body, a boiler steam drum that is provided above the combustion chamber for filling water, and a fire tube that connects the combustion chamber and the flue gas outlet for heat exchanging between the flue gas and the water in the boiler steam drum, wherein the combustor is provided on the one end wall of the boiler body, so as to inject fuel into the combustion chamber for radiation heating the boiler steam drum by combusting the fuel, the water inlet and the high pressure steam outlet are provided on the top of the boiler steam drum.

* * * * *